Patented Nov. 17, 1925.

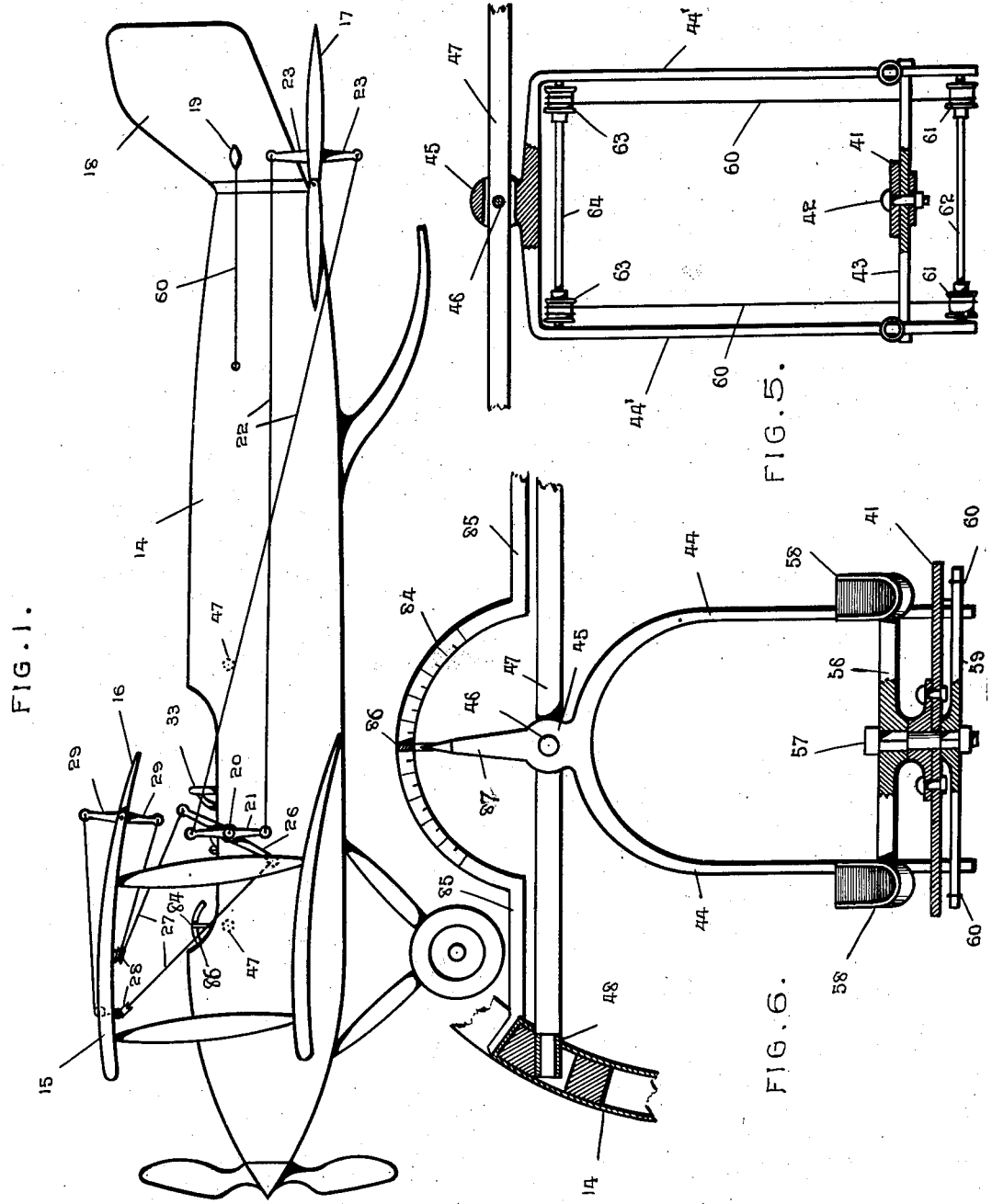

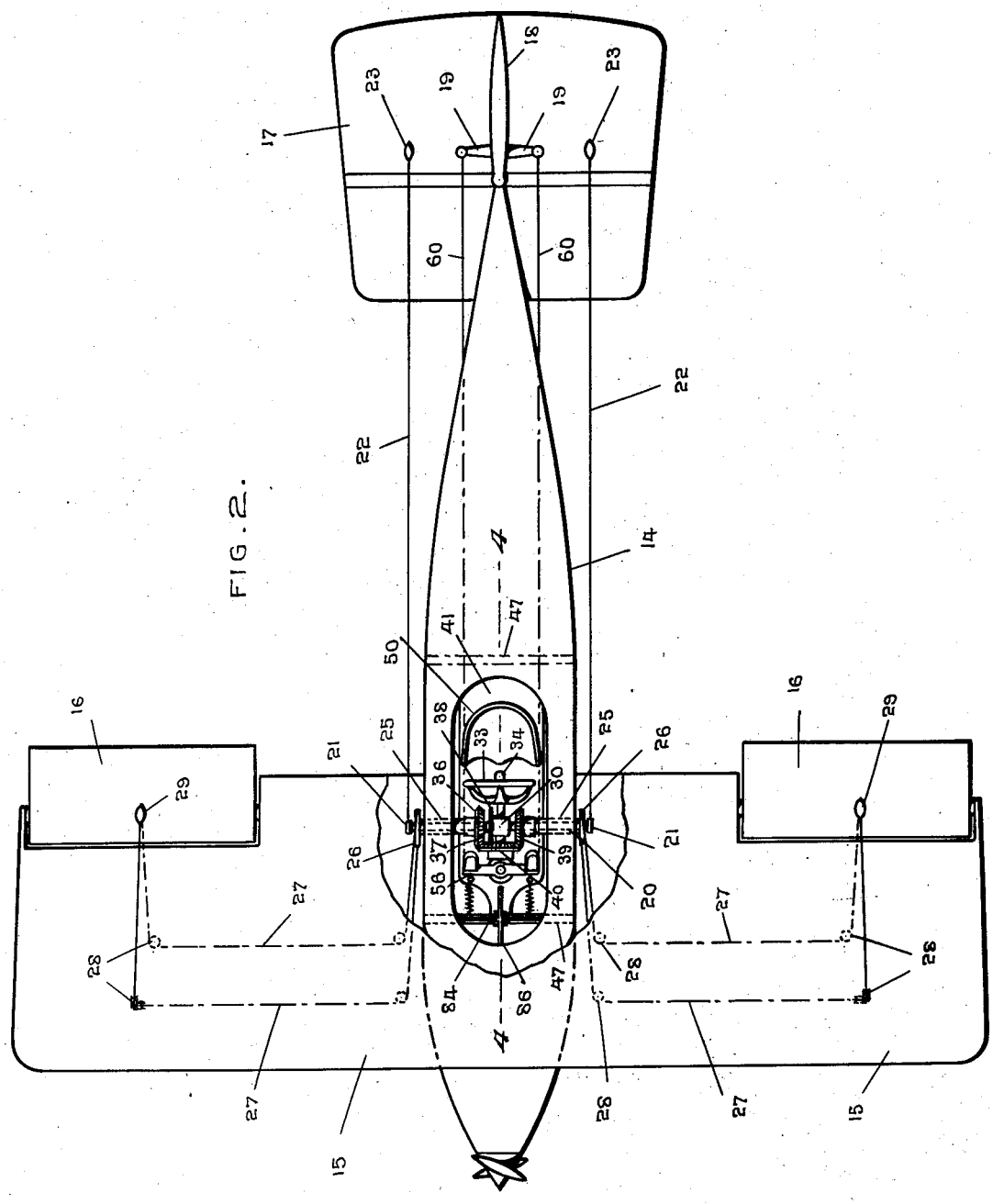

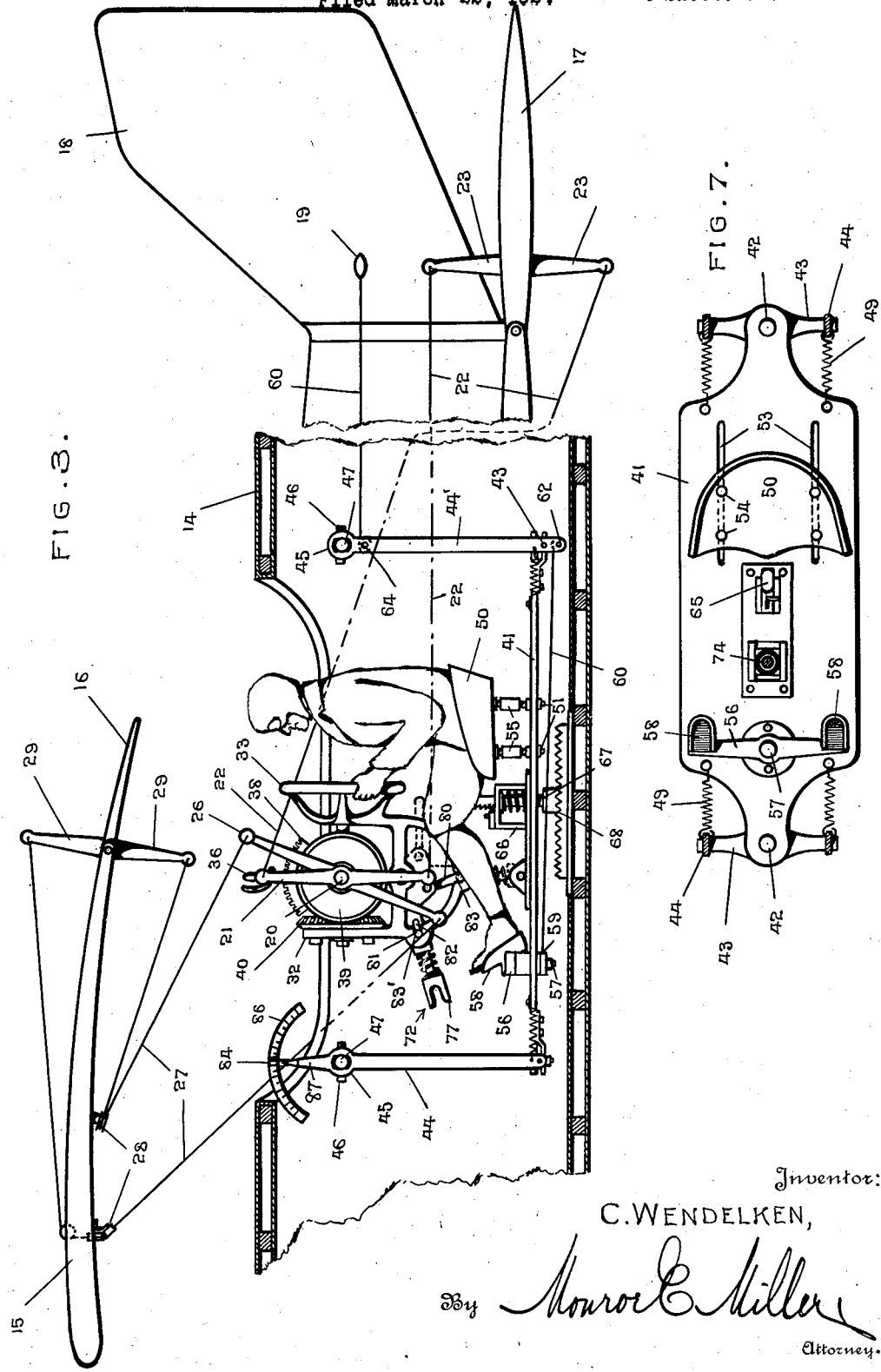

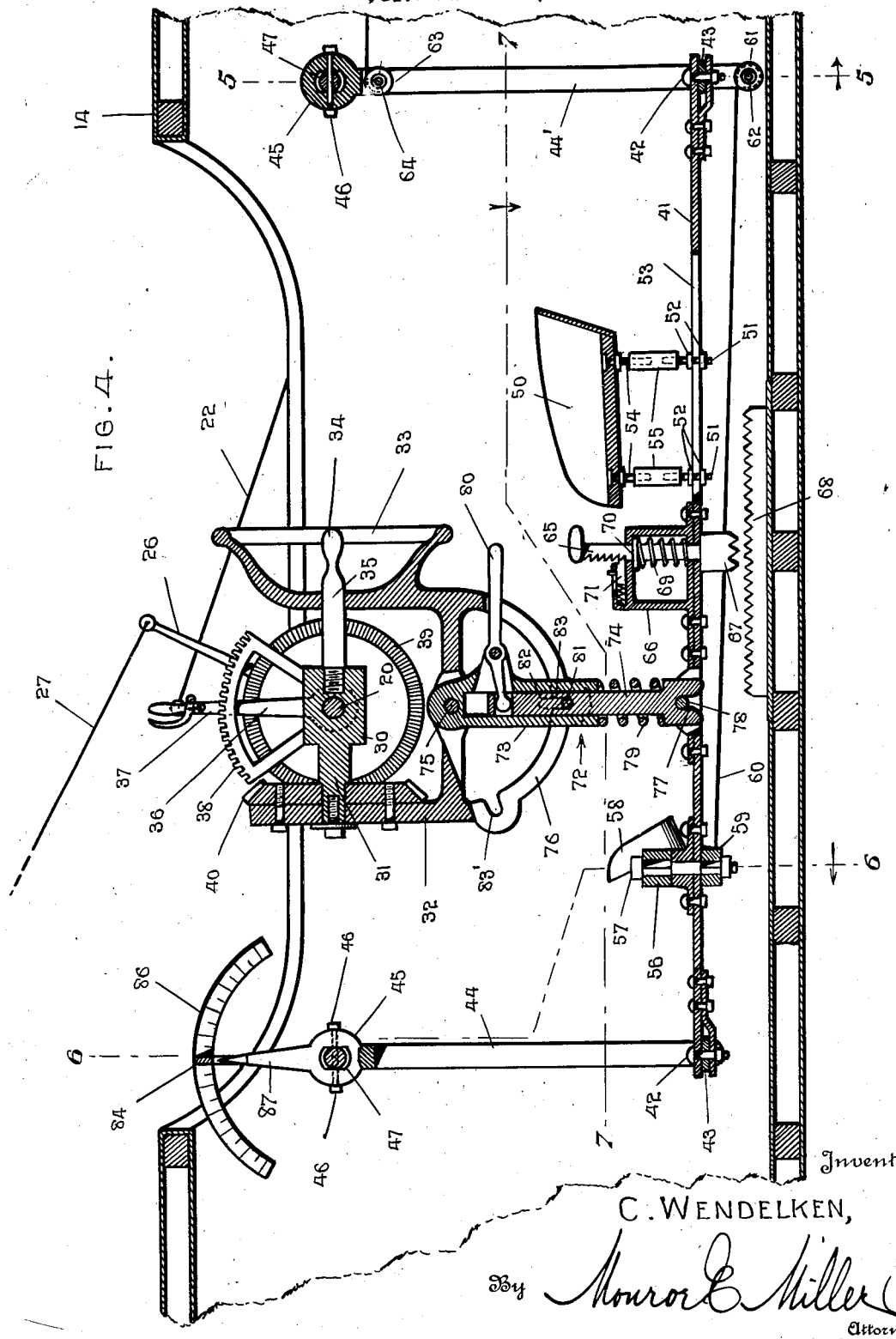

1,561,961

UNITED STATES PATENT OFFICE.

CHARLES WENDELKEN, OF CORPUS CHRISTI, TEXAS.

AIRCRAFT CONTROL AND STABILIZER.

Application filed March 22, 1924. Serial No. 701,071.

*To all whom it may concern:*

Be it known that I, CHARLES WENDELKEN, a citizen of the United States, residing at Corpus Christi, in the county of Nueces and State of Texas, have invented certain new and useful Improvements in Aircraft Controls and Stabilizers, of which the following is a specification, reference being had therein to the accompanying drawing.

The present invention relates to devices for controlling the direction and position of flight of aircraft, and aims to provide a novel and improved aircraft control and stabilizer that is advantageous over previous control devices.

Another object is the provision of a control and stabilizing mechanism which will enable the ailerons and elevator, or other balancing surfaces, to be controlled either manually or automatically, or by joint automatic and manual control, in order that the equilibrium or position of flight of the aircraft can be maintained by the automatic control, and, at the same time, to permit of manual control.

The invention also has for an object the improvement of the mechanism in its general construction and in the several parts thereof, in order to increase the efficiency and utility of the mechanism.

A further object is the combination in the control device of an inclinometer to indicate the lateral and the fore and aft inclinations of the aircraft.

With the foregoing and other objects in view, which will be apparent as the description proceeds, the invention resides in the construction and arrangement of parts, as hereinafter described and claimed, it being understood that changes can be made within the scope of what is claimed without departing from the spirit of the invention.

The invention is illustrated in the accompanying drawings, wherein—

Figure 1 is a side elevation of an airplane equipped with the improved control and stabilizer.

Fig. 2 is a plan view thereof, a portion of the top wings being broken away.

Fig. 3 is an enlarged fragmentary view showing the control and stabilizer in elevation.

Fig. 4 is an enlarged vertical section on the line 4—4 of Fig. 2.

Figs. 5 and 6 are vertical sections on the respective lines 5—5 and 6—6 of Fig. 4.

Fig. 7 is a reduced horizontal section on the line 7—7 of Fig. 4.

The improvements are shown as embodied in an airplane, although it will be understood that same may be incorporated in other types of aircraft, either the lighter or the heavier than air varieties. The airplane shown is of conventional construction, having the fuselage or body 14, wings or planes 15, ailerons 16 carried by the wings for upward and downward swinging movement, a rear elevator 17 connected to the aft end of the body for upward and downward swinging movement, and a rudder 18 connected to the aft end of the body for lateral swinging motion. Instead of the ailerons 16 and elevator 17 other suitable lateral and fore and aft balancing surfaces can be used.

The control bridge includes a transverse shaft 20 mounted in the body 14 having arms 21 secured to the opposite ends thereof, at the opposite sides of the body, which arms are connected by cables or wires 22 with arms 23 secured to the elevator or fore and aft balancing surface 17, whereby the turning movement of the shaft 20 will raise and lower the elevator 17 to control the fore and aft balance of the airplane.

The control bridge also includes tubular shafts or sleeves 25 mounted for rotation on the shaft 20, and having arms 26 secured to the opposite ends thereof at the opposite sides of the body, between the arms 21 and the body. Cables or wires 27 are secured to the arms 26 and pass over pulleys or other guides 28 carried by the wings 15, and said cables are connected to arms 29 carried by the ailerons or lateral balancing surfaces 16, whereby the rotation of the shafts 25 will raise and lower said ailerons.

The means for connecting the shafts 20 and 25 with the balancing surfaces can of course be varied as may be necessary or desirable, under different circumstances.

The control bridge includes means for turning the shaft 20, for turning both shafts 25 simultaneously in the same direction, or for turning the shafts 25 in opposite directions, in order that the ailerons and elevator can be controlled for lateral and fore and aft balance. Thus, a block 30 is mounted on the shaft 20 intermediate the ends of said shaft, and has a forwardly projecting pintle 31, and a rearwardly extending stem 35. A depending yoke 32 is mounted on said pintle 31 and stem 35 for lateral swinging motion about the axis of said pintle 31 and stem 35, and the yoke 32 is formed or provided at the rear portion thereof with a hand wheel 33. The stem 35 has a handle 34 at the center of the wheel 33 for convenience in turning the yoke 32 about the axis of the shaft 20. An upstanding lever 36 is secured to the shaft 20 at one side of the block 30 and has a dog or catch 37 to engage the segment 38 carried by said block, whereby to maintain the block 30 and shaft 20 in a predetermined angular position relatively to one another about the axis of said shaft. The dog or catch 37 can be manually disengaged from the notches or teeth of the segment 38, so that the lever can be swung to turn the shaft 20 relatively to the block 30, when it is desired to change or adjust the relative angular position between said shaft and block. The shaft 20 therefore turns with the block 30 and the yoke 32 when said yoke and block are rotated about the axis of said shaft 20. Bevel gear wheels 39 are secured to the adjacent ends of the shafts 25 and mesh with a bevel gear wheel 40 secured to the front arm of the yoke 32 around the pintle 31. The gear wheel 40 thus turns with the yoke 32 about the axis of the pintle 31 and stem 35 for turning the gear wheels 39 in opposite directions, and said gear wheel 40 will turn with the yoke 32 about the axis of the shaft 20, to turn the gear wheels 39 and shafts 25 simultaneously in the same direction. It will be noted that the yoke 32 is mounted to turn about the axis of the shaft 20 for turning said shaft and the shafts 25 simultaneously in the same direction, and the connections between said shafts and the ailerons and elevator are such that the ailerons and elevator will move in opposite directions to control the fore and aft balance of the airplane in the well known manner. The yoke 32 is also mounted to turn about the axis of the pintle 31 and stem 35, at right angles to the axis of the shaft 20, whereby the gear wheels 39 and shafts 25 are rotated in opposite directions, so that the ailerons 16 at the opposite sides will be swung in opposite directions for controlling the lateral balance, as well known. The hand wheel 33 is conveniently manipulated by the pilot, being raised and lowered for fore and aft balance, and being rotated about its axis for lateral balance. The manual control is therefore had by manipulating the wheel 33, and the handle 34 can be used, if desired, for fore and aft balance, to turn the yoke 32 about the axis of the shaft 20.

The automatic control of the balancing surfaces is obtained by a pendent counterbalance suspended in the body for lateral and fore and aft movements and with which the control bridge is connected, so that the ailerons and elevator are controlled accordingly. The counterbalance includes a board 41 extending longitudinally within the body below the control bridge, and connected by vertical pivots 42 at its ends with cross bars 43 that have their terminals engaging the lower portions of fore and aft hangers 44 and 44', respectively. Said hangers are of arched form, as shown, and are connected at their crowns by pivots 46 with the transverse shafts 47 journaled in bearings 48 carried by the opposite sides of the body. The shafts 47 are in a common plane with the shaft 20, whereby the hangers 44 and 44' can oscillate the same as the yoke 32, as will hereinafter appear. The pivots 46 permit the hangers to swing laterally in and relatively to the body, and said hangers can turn with the shafts 47 so as to swing forwardly and rearwardly in the body. The bars 43 have pivotal connections with the hangers so that the board 41 will remain substantially parallel with the body when the hangers swing forwardly and rearwardly. The pivots 42 permit the bars 43 to oscillate relatively to the body about the vertical axes of said pivots. Coiled springs 49 are connected to the board 41 and bars 43. Thus, when the body is tilted laterally, or when making a turn, the position of the hangers 44 and 44' relatively to the body is changed laterally of the body, and if the center of gravity of the weight imposed on the board 41 is not at the point midway between the hangers, there is a tendency for one end of the board 41 to move laterally more than the other end, resulting in the board 41 getting out of parallel position relatively to the sides of the body. However, the springs 49 resist such twisting motion, although permitting such motion to occur when the force is sufficient to overcome the tension of the springs. Such springs therefore tend to maintain the board 41 parallel with the sides of the body during the oscillation of the hangers and body relatively to one another in different directions.

The board 41 and hangers 44 and 44' by means of which the board is suspended for swinging movements laterally and longitudinally, form a "swing," and the pilot or aviator forms part of the counterbalance, inasmuch as the seat 50 for the pilot is mounted on the board 41. The pilot is thus seated on the swing so that his weight constitutes part of the counterbalance, although other suitable weight can be used, if desired, to maintain the hangers 44 and 44' substantially vertical in the different positions of the body during flight. It is apparent that the weight imposed on the board 41, and the hangers being suspended for lateral and fore and aft oscillations, will result in the hangers remaining substantially perpendicular to the earth's surface or vertical when the body is tilted either laterally or longitudinally.

The seat 50 is adjustably supported on the board 41, to raise and lower the seat, and to adjust same longitudinally of the board, for the convenience of the pilot and to apply his weight to the board at the desired longitudinal point. Thus, bolts 51 extend through the board 41 and have nuts 52 threaded thereon for clamping said bolts to the board, said board having longitudinal slots 53 in which the bolts are disposed so that the bolts can be adjusted longitudinally. Depending bolts 54 are secured to the seat 50 and are connected by turnbuckles 55 with the bolts 51, said turnbuckles having right and left hand screw thread connections with the bolts, in order that when the turnbuckles are rotated, the seat will be raised and lowered. Thus, the turnbuckles can be adjusted for raising and lowering the seat, and the bolts 51 are adjustable longitudinally in the slots 53, although equivalent means for such adjustments can be used.

The control of the rudder 18 comprises a foot lever 56 above the board 41 in front of the seat 50, secured to a vertical shaft 57 journaled through said board, and the opposite arms of the lever 56 have foot rests 58, whereby the pilot can conveniently turn the lever 56 by the movement of his legs. A lever 59 is secured to the shaft 57 below the board 41 and cables or wires 60 are secured to the opposite arms of the lever 59 under the board 41, and extend rearwardly. Said cables 60 pass around pulley wheels 61 mounted for rotation on a transverse rod 62 carried by the hanger 44' below the corresponding bar 43, and from the pulley wheels 61, the cables 60 extend upwardly and pass over pulley wheels 63 mounted for rotation on a transverse rod 64 carried by the hanger 44' immediately under the shaft 47. From the pulley wheels 63, the cables 60 extend rearwardly and are connected to the arms 19 secured to the rudder 18. Thus, when the lever 56 is turned, the cables 60 will move in opposite directions, for turning the rudder 18. It will be noted that the rudder operating lever or member 56 is carried by the swing or pendent counterbalance, whereby the rudder can be controlled by the pilot in the different positions of the swing and body relatively to one another, the operative connection between the rudder and control lever 56 being flexible at the pulley wheels 61 and 63 to accommodate the forward and rearward movements of the hanger 44'. The pulley wheels 61 and 63 are equal distances below the corresponding bar 43 and shaft 47, respectively, so that the tendency for the cables being lengthened, when wound on the pulley wheels at the upper or lower end of the hanger 44', will be compensated for by a contrary action at the other pulley wheels. For example, when the board 41 and hangers move forwardly relatively to the body, the cables 60 will be wound slightly further on the lower pulley wheels 61, thereby tending to stretch the cables, but this action is counteracted at the upper pulley wheels 63, since the cables unwind slightly from said pulley wheels 63. Conversely, when the board 41 and hangers move rearwardly relatively to the body, so that the cables 60 wind slightly further on the upper pulley wheels 63, the cables unwind substantially the same amount from the lower pulley wheels 61. This will keep the cables taut, without such cables being stretched excessively and snapping or breaking.

Means is provided for fixing or stabilizing the swing or counterbalance relatively to the body, in order to prevent relative movements between the board 41 and body. For this purpose, in the embodiment as shown, the shank 65 is slidable through the board 41 and a member 66 secured on said board and has a toothed foot 67 at its lower end to engage a toothed plate or member 68 secured on the bottom of the body, whereby when said shank is depressed to engage the foot 67 with the member 68, the board 41 is immobilized relatively to the body. The shank 65 is normally raised by a spring 69 disposed between the board 41 and a collar 70 secured to the shank, and a ratchet device 71 is used for holding the shank 65 down. The shank 65 can be conveniently depressed by the pilot, when it is desired to immobilize the swing or counterbalance, so as to terminate automatic control, and the device 71 is readily released manually so that the spring 69 raises the foot 67, when it is desired to put the automatic control into effect.

The automatic control of the bridge is obtained by a control stick 72 composed of the telescoping sections 73 and 74, whereby said stick is adapted to be extended and retracted for connecting and disconnecting the control bridge and swing or counterbalance. The upper tubular section 73 is pivoted, as at 75, to the yoke 32 so as to swing forwardly and rearwardly, and the yoke 32 has a depending arcuate guide 76 in which the section 73 is guided for forward and rearward swinging movement to and from operative position. The lower section 74 of the control stick 72 has a bifurcated or notched portion 77 at its lower end to engage over a pin 78 or other member secured on the board 41, whereby the stick 72 is moved with the board 41 relatively to the body 14. A coiled spring 79 surrounds the section 74 of the stick and is confined between the section 73 and the portion 77, whereby to depress the section 74 and to hold it in engagement with the board 41.

For convenience in disengaging the stick 72 from the swing or counterbalance, a lever 80 is fulcrumed to the section 73 and engages the section 74, so that when the rear arm or handle of the lever is depressed by the pilot, the section 74 is raised to disengage it from the board 41. By the same movement of the lever 80, after the stick 72 is disconnected from the board 41, the stick can be swung forwardly out of the way, as shown in Fig. 3, so as not to encounter the legs of the pilot when the manual control is used with the board 41 locked to the body in which event the yoke 32 and parts carried thereby move laterally and fore and aft relatively to the board 41.

In order to retain the stick 72 in either operative or inoperative position, a transverse pin 81 is carried by the section 74 and extends through slots 82 in the opposite sides of the section 73. The guide 76 has notches 83 to receive the pin 81 when the stick 71 is in operative position and the section 74 is depressed into engagement with the board 41. The guide 76 has other notches 83' to receive the pin 81 when the stick is swung forwardly out of the way. When the lever 80 is swung to retract the section 74, the pin 81 is removed from the corresponding notches, and the stick can then be swung to the other position, in which event the pin 81 will snap into the other notches, as will be apparent.

The manual control, independent of automatic control, is obtained by immobilizing the swing or counterbalance, and disconnecting the bridge from said swing or counterbalance. Thus, the shank 65 is depressed to engage the foot 67 with the member 68, thereby preventing the board 41 from moving relatively to the body, and the lever 80 is swung to raise the lower section 74 of the control stick 72 out of engagement from the board 41. The control stick 72 is then swung forwardly out of the way, the pin 81 snapping into the notches 83' to hold said stick in such position. The bridge is now free from the counterbalance, and by manipulating the wheel 33. lateral and fore and aft balance is obtained in the usual manner, as hereinbefore described.

To obtain automatic control, the control stick 72 is swung rearwardly and the lower end thereof is engaged with the pin or keeper 78 of the board 41, so as to connect the yoke 32 or control member of the bridge with the board or member 41 of the counterbalance. The catch or device 71 is disengaged from the shank 65 so that the foot 67 is raised from the plate or member 68, thereby mobilizing the counterbalance, so that automatic control is effective at once.

Lateral balance is accomplished by the relative lateral movements between the body and counterbalance. Thus, should the body tilt toward one side, the counterbalance remaining in substantially vertical position, will maintain the control stick 72 in such vertical position, and the shaft 20 being tilted laterally with the body, will raise one gear wheel 39 and lower the other one relatively to the gear wheel 40. This will turn the shafts 25 in opposite directions on the shaft 20, and through the operative connections with the ailerons, will raise one aileron and lower the other, so as to restore the lateral balance of the body. In other words, if the body tilts toward the left, the ailerons are adjusted through the action of the counterbalance, to turn the body toward the right, to restore lateral balance, and vice versa.

The fore and aft balance of the airplane is accomplished by the forward and rearward movements of the counterbalance relatively to the body. Thus, supposing that the body should dip forwardly, the counterbalance remaining in substantially vertical position, would result in the counterbalance moving forwardly relatively to the body, and the control stick 72 and yoke 32 would be swung forwardly also. The shafts 20 and 25 would therefore be turned (clock-wise as seen in Figs. 1, 3 and 4), thereby raising the elevator 17 and depressing both ailerons 16, so as to raise the fore end of the body relatively to the rear end, and restore fore and aft balance. Conversely, should the aft end of the body dip downwardly, the counterbalance would, in remaining in substantially vertical position, move rearwardly relatively to the body, thereby moving the control stick 72 and yoke 32 in the same direction. The shafts 20 and 25 would therefore be turned in the opposite direction, so as to swing the elevator 17 downwardly and the ailerons 16 upwardly, thereby raising the aft end of the body and depressing the fore end, to restore the fore and aft balance automatically.

During automatic control, the weight of the pilot is imposed on the swing, to constitute the counterbalance, whereby the swing remains in substantially vertical position, to control the balancing surfaces, and the pilot can assist manually in the control. Thus, by grasping the wheel 33 the pilot can either assist in or resist the automatic control, as may be needed in the desired flight of the airplane. By exerting a turning force on the wheel 33, the manual effort can shift the swing laterally, or by pushing or pulling on said wheel 33, the swing can be moved longitudinally, either in conjunction with or contrary to the automatic control. The automatic control is instantly terminated by immobilizing the counterbalance, and manual control is effective exclusively when the bridge is then disconnected from the counterbalance.

The mechanism combines therein an inclinometer, so that the pilot may observe, at all times, the lateral and the fore and aft inclinations of the aircraft. For this purpose, a transverse arched scale 84 is disposed above the forward shaft 47 and is connected by brackets 85 with the opposite sides of the body, a longitudinal arched scale 86 is carried by the scale 84, said scales being graduated to indicate the lateral and fore and aft inclinations, respectively. An upstanding pointer 87 is carried by the hanger 44 and will indicate on the scale 84 the lateral inclination, and will indicate on the scale 86 the fore and after inclination. The inclinometer is thus a part of the automatic control, and with the aircraft, in true balance, both laterally and fore and aft, the pointer 87 will be immediately below the intersection of the two scales 84 and 86.

The fore and aft balance, in the first instance, is obtained by adjusting the shafts 20 and 25 relatively to one another, to change the relative position of the ailerons 16 and elevator 17. Thus, by disengaging the dog 37 from the segment 38, the lever 36 can be swung to turn the shaft 20 and raise or lower the elevator 17, while the ailerons 16 remain in the same position. After the fore and aft balance is obtained, the dog 37 is engaged with the segment 38, thereby locking the shaft 20 to the yoke 32, but after such relative adjustment between the ailerons and elevator is once obtained, it need not be disturbed, excepting when it is desired to change the fore and aft position of the body in flight. The lever 36 is used, when disengaged from the segment 38, to balance the aircraft fore and aft for horizontal flight or for ascent or descent, and after the fore and aft position of the body is obtained by the adjustment of the lever 36, the automatic control will thereafter maintain such fore and aft position of the body, with the lever 36 locked to the segment 38, and the control connected to the counterbalance.

During automatic control, such control can be assisted by or opposed by the aviator, in addition to force applied to the wheel 33, should the aviator lean or shift his weight to either side.

The springs 49 are intended to act when opposed by the load (represented by the control stick) when the body is tilted laterally. If the power (weight on board 41) is equally distributed, for equal distances fore and aft of control, there is no action of the springs. The control stick is the only disturbing factor. The springs should be of sufficient strength to overcome any resistance offered by the control stick to prevent all twisting motion of the board 41. Such spring action in no way impairs the simple lateral and fore and aft movements, but maintains the parallelism of the board. However, when the board 41 swings fore and aft, and at the same time laterally, there is an additional action of the springs tending to restore the board 41 to the longitudinal axis of the body.

Having thus described the invention, what is claimed as new is:—

1. A control mechanism for aircraft including an elevator operating shaft, two aileron operating gear wheels rotatable on said shaft, a member arranged to turn with said shaft and adjustable angularly relatively to said shaft, and an intermediate gear wheel carried for rotation by said member and connected to the aforesaid gear wheels.

2. A control mechanism for aircraft including an elevator operating shaft, two aileron operating gear wheels rotatable on said shaft, a member on said shaft, means for adjusting said member and shaft angularly relatively to one another, a manually operable member carried by the aforesaid member for oscillation about an axis at an angle with the axis of said shaft, and also movable with the first named member about the axis of said shaft, and a gear wheel carried by the last named member and connected to the aforesaid gear wheels.

3. A control mechanism for aircraft including an elevator operating shaft, two aileron operating gear wheels rotatable on said shaft, a member on said shaft, means connecting said shaft and member for changing the angular relation between them, a yoke connected to said member for turning movement with said member and shaft and for oscillation about an axis at an angle with the axis of said shaft, and a gear wheel secured to the yoke and connected to the aforesaid gear wheels, said yoke being formed with a hand wheel for turning the yoke about both of said axes.

4. A control mechanism for aircraft comprising a shaft having means for connection with an elevator, tubular shafts on said shaft having means for connection with ailerons, gear wheels secured to said tubular shafts, a member mounted on the first named shaft to turn therewith, and an intermediate gear wheel carried for rotation by said member and connected to the aforesaid gear wheels.

5. A control mechanism for aircraft including an elevator operating shaft, two aileron operating gear wheels rotatable on said shaft, a member mounted on said shaft to turn therewith, a member carried by the aforesaid member to turn with said member and shaft and to turn about an axis at an angle with the axis of said shaft, and a gear wheel secured to the second named member and connected to the aforesaid gear wheels, the second named member having a hand wheel for convenience in turning the second named member and last named gear wheel about the first named axis, and the first named member having a handle centrally of said hand wheel.

6. A control mechanism for aircraft including elevator operating means, aileron operating means, and operating mechanism operably connected with said elevator and aileron operating means and having adjustable means to change the angular relation of the elevator and aileron operating means.

7. A control mechanism for aircraft including an elevator operating shaft, two aileron operating wheels rotatable on said shaft, a member arranged to turn with said shaft, an adjustable connection between said member and shaft to change the angular relation thereof, an intermediate wheel carried for rotation by said member and connected to the aforesaid wheels, and means for turning said member about the axis of said shaft and for turning said intermediate wheel about its axis.

8. In an aircraft, a body, balancing surfaces, hangers suspended in the body for swinging movements in different directions, a member having pivotal connections with said hangers, operating means for said balancing surfaces arranged to be operated by said member, and spring means between said member and hangers tending to maintain said member and hangers in a normal position relatively to one another.

9. In an aircraft, a body, balancing surfaces, fore and aft hangers suspended in the body for lateral and fore and aft swinging movements, cross bars carried by said hangers, a longitudinal member having pivotal connections with said cross bars, spring connections between said cross bars and member tending to maintain said bars and member in a predetermined position relatively to one another, and operating means for said balancing surfaces arranged to be operated by said member.

10. In an aircraft, a body, balancing surfaces, a rudder, a swing suspended in the body, operating means for said balancing surfaces arranged to be operated by said swing, a pilot's seat carried by the swing, a rudder operating member carried by the swing and having foot rests to be operated by the feet of the pilot, and an operative connection between said member and rudder and having flexible portions to accommodate the movements of said swing.

11. In an aircraft, a body, balancing surfaces, a rudder, hangers suspended in the body for swinging movement, a member carried by said hangers, a pilot's seat carried by said member, operating means for said balancing surfaces arranged to be operated by said member, a rudder operating member carried by the aforesaid member, cables connecting said operating member and rudder, and guiding means for said cables carried by one hanger and arranged to maintain said cables taut during the swinging movements of said hangers.

12. In an aircraft, a body, balancing surfaces, a swing suspended in the body, a pilot's seat carried by the swing, control means for said surfaces including a member movable similarly to the swing for controlling said surfaces, said member being disposed above the swing and being operable by the pilot, and a control stick pivotally connected with said member at the upper end of the stick and engageable at its lower end with the swing, said stick being swingable out of the way when disconnected from the swing, and said stick and member having portions to retain the stick in either position.

13. A control mechanism for aircraft including an elevator operating shaft rotatable about a transverse axis, two aileron operating wheels rotatable about said axis, a member mounted on said shaft to turn therewith, a control wheel carried by said member for rotation about an axis at an angle to the aforesaid axis and operatively connected with the aforesaid wheels, and a pendant counterbalnce suspended in the body for lateral and fore and aft movements and connected with said member and control wheel to turn said member about the first named axis when the counterbalance moves fore and aft and to turn the control wheel about the second named axis when the counterbalance moves laterally.

14. A control mechanism for aircraft including an elevator operating shaft rotatable about a transverse axis, two aileron operating wheels rotatable about said axis, a member mounted on said shaft to turn therewith, a control wheel carried by said member for rotation about an axis at an angle to the aforesaid axis and operatively connected with the aforesaid wheels, and a swing suspended in the body for lateral and fore and aft movements and having means for supporting the pilot, said swing being connected with said member and control wheel for turning said member about the first named axis when the swing moves fore and aft and to turn the control wheel about the second named axis when the swing moves laterally.

15. A control mechanism for aircraft including an elevator operating shaft rotatable about a transverse axis, two aileron operating wheels rotatable about said axis, a member mounted on said shaft to turn therewith, a control wheel carried by said member for rotation about an axis at an angle to the aforesaid axis and operatively connected with the aforesaid wheels, fore and aft hangers suspended for swinging movements about transverse axes parallel with the first named axis and for swinging movement about a longitudinal axis, a longitudinal member pivotally supported by said hangers, and a connection between said longitudinal member and the first named member and control wheel to turn the first named member and control wheel about the first named and second named axes when said longitudinal member moves fore and aft and laterally, respectively.

16. A control mechanism for aircraft including an elevator operating shaft rotatable about a transverse axis, two aileron operating wheels rotatable about said axis, a member mounted on said shaft to turn therewith, a control wheel carried by said member for rotation about an axis at an angle to the aforesaid axis and operatively connected with the aforesaid wheels, a swing suspended for lateral and fore and aft movements and having means for supporting the pilot, means for connecting said swing with and disconnecting it from said member and control wheel, and means for immobilizing the swing.

17. In an aircraft, a body, balancing surfaces, a swing suspended in the body for lateral and fore and aft movements, and having means for supporting the pilot, control means for said balancing surfaces operable by the pilot and having means for connection with the swing for automatic operation thereby, and means for immobilizing the swing relatively to the body including interengageable portions carried by the swing and body to engage in different fore and aft positions of the swing and body relatively to one another.

18. A control mechanism for aircraft including balancing surfaces, a swing having means for supporting the pilot, control means for said surfaces having means for operation by the pilot, and a control stick connecting said control means and swing for the automatic operation of said control means, said stick being adapted to disconnect said control means and swing and being movable to a position out of the way of the pilot without affecting the manual control of said control means.

19. In an aircraft, a body, balancing surfaces, an elevator operating shaft mounted in the body and rotatable about a transverse axis, two aileron operating wheels rotatable about said axis, a member mounted on said shaft to turn therewith, a control wheel carried by said member for rotation about an axis at an angle to the aforesaid axis, and operatively connected with the aforesaid wheels, a swing suspended in the body for lateral and fore and aft movements and having means for supporting the pilot, and a control stick connected to said member and control wheel and having means to engage and disengage the swing.

20. In an aircraft, a body, balancing surfaces, control means for said surfaces including a member mounted in the body for lateral and fore and aft swinging movements and having means operable manually by the pilot, a swing suspended in the body for lateral and fore and aft movements and having means for supporting the pilot, and a control stick pivotally connected with said member and having means to engage and disengage the swing and means for holding said stick in different positions relatively to said member.

In testimony whereof I hereunto affix my signature.

CHARLES WENDELKEN.